UNITED STATES PATENT OFFICE.

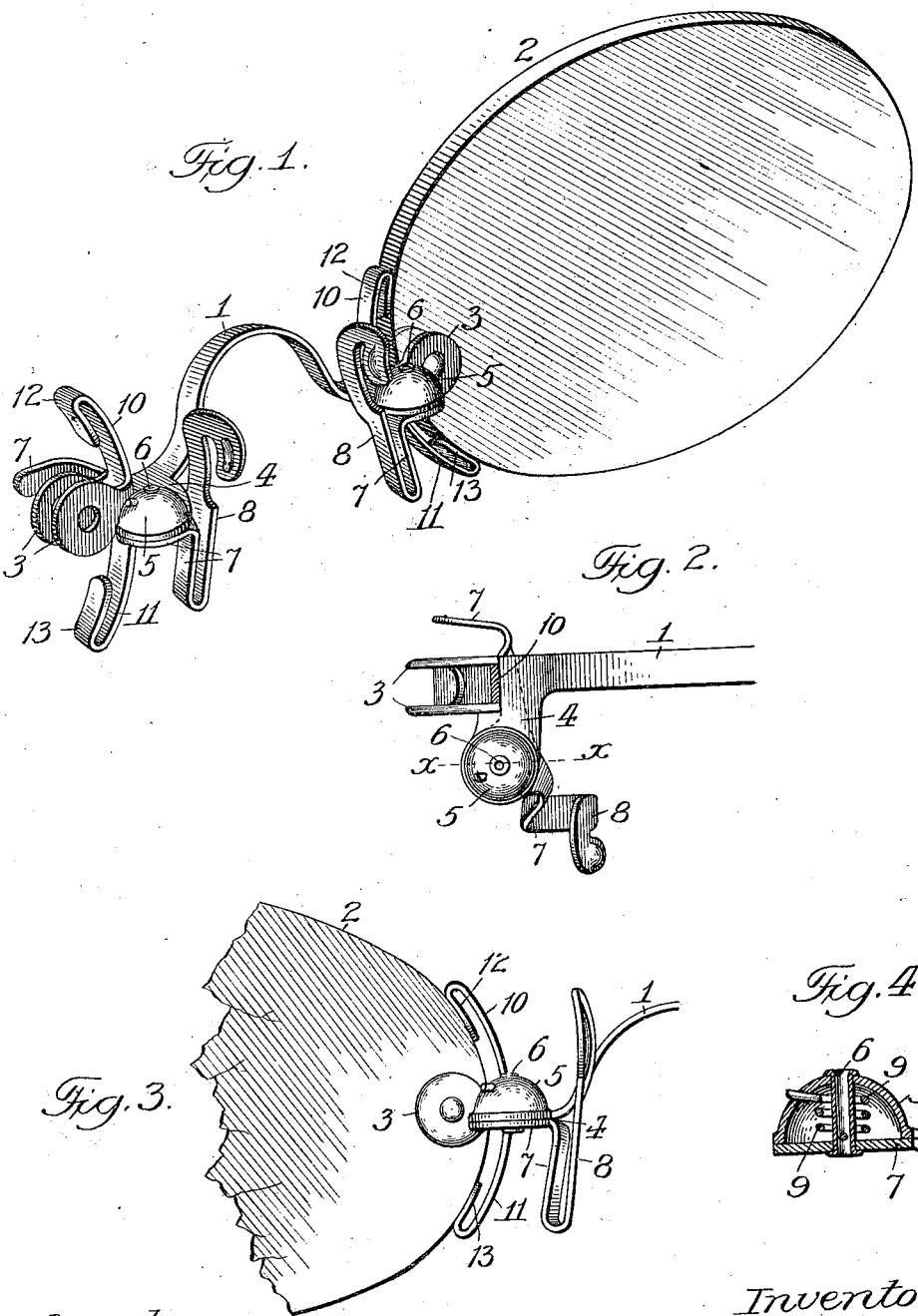

WILLIAM R. UHLEMANN, OF CHICAGO, ILLINOIS.

EYEGLASS-MOUNTING.

1,036,034.     Specification of Letters Patent.     Patented Aug. 20, 1912.

Application filed May 14, 1909. Serial No. 496,037.

*To all whom it may concern:*

Be it known that I, WILLIAM R. UHLEMANN, a citizen of the United States of America, and a resident of Chicago, in the county of Cook and State of Illinois, have invented certain new and useful Improvements in Eyeglass-Mountings, of which the following is a specification.

This invention relates to frameless eyeglass mountings, and has for its object, to provide a simple and efficient construction of the arched bridge by which a strong attachment of the attaching clips thereto can be made, and to provide a simple and compact pivotal connection and arrangement of the nose grip carrying levers and their actuating springs to the arched bridge of the mounting, all as will hereinafter more fully appear.

In the accompanying drawings: Figure 1, is a perspective of a portion of an eyeglass mounting having the present invention applied. Fig. 2, is a detail plan view of the same. Fig. 3, is a detail rear elevation of the same. Fig. 4, is an enlarged section on line $x$—$x$, Fig. 2.

Similar numerals of reference indicate like parts in the several views.

Referring to the drawings, 1 represents the rigid arched bridge which connects the pair of lenses 2 together in spaced relation, and to such end the bridge is provided with attaching clips 3, for engagement with the lenses, as usual in rimless eyeglasses of the present type.

In the present improvement the rigid bridge 1 will have its end portions 4 offset, as shown, to provide recesses in which the attaching clips 3 fit and are brazed to afford an extended and substantial connection of the parts, and also to provide ears or points of attachment for the nose-grip carrying levers and their actuating springs, hereinafter described, to the side of the lenses and much closer to the optical axis thereof than could be attained with the ordinary location of such pivotal points at the base of the arch of the bridge. The purpose in view is to afford a much shorter pupillary distance between the lenses to fully meet a very common requirement in the art. In the preferred construction such pivotal points of attachment are formed at the top of cup shaped enlargements 5 in the metal of the offset bridge ends 4, aforesaid, which provide containing cavities for the lever actuating springs before referred to. With such construction the pivot rods 6 pass centrally through said cup shaped enlargements and are preferably of a tubular form and fixedly attached to the levers in any usual manner while their upper ends pass through the crowns of said cup shaped enlargements and are swaged or flanged over the same to hold the parts in operative connection.

7 are the nose-grip carrying levers heretofore referred to, and which are pivoted on the underside of the arched bridge 1, as above described. The outer ends of said levers form the usual finger prongs for engagement by the user in applying or removing the eyeglasses, and are offset from their pivot portions in order to provide for their movement to and from the respective clips aforesaid while the rear ends of said levers carry the nose grips 8, of any usual form, and connected in any usual manner to the respective carrying levers 7.

9 are the coiled springs above referred to, and which are arranged within the cavity of the cup shaped enlargements 5 aforesaid, with their inner ends attached to the pivot rods 6, and their outer ends attached to the shell of said embossments, preferably by extensions of the springs passing through orifices in said shells as shown in Fig. 4.

With the construction described the pivot axis of each grip carrying lever is brought into much nearer relation to the optical center of an adjacent lens, than can be attained with the arrangement of parts heretofore used or proposed in the finger piece type of eyeglasses, and accordingly a very short pupillary distance between the lenses of the eyeglass can be readily and conveniently attained in filling a very ordinary and usual requirement, and which it is very difficult, and in some cases impossible, to fill with the ordinary stock form of mountings. In the attainment of the aforesaid short pupillary distance between the lenses, the arrangement of the levers beneath the bridge is of material benefit, in that with such arrangement a greater range of movement of the levers can be had without interfering with the normal functions of the other parts of the mounting.

10 and 11 are the upper and lower bracing prongs of the respective attaching clips 3, aforesaid, and which prongs in the construction shown are made of spring metal and have their free ends formed with return bends 12 and 13, the free portions of which in turn have bearing against the edges of the lenses and provide resilient braces for the lenses which admit of limited independent movement between said lenses and their attaching clips to prevent in a great measure accidental breakage due to a rigid and unyielding connection between the parts.

Having thus fully described my said invention what I claim as new and desire to secure by Letters Patent, is:—

1. In an eyeglass mounting, the combination of a rigid arched bridge having attaching clips and offset pivot ears at its respective ends, said pivot ears being projected outwardly beyond the heels of said clips and formed with cup shaped enlargements, a pair of levers pivoted to said pivot ears and having their finger portions offset, nose grips carried by said levers, and springs arranged in the cavities of the cup shaped enlargements of the pivot ears and adapted to actuate the levers in one direction, substantially as set forth.

2. In an eyeglass mounting, the combination of a rigid arched bridge having attaching clips and offset pivot ears at its respective ends, said pivot ears being projected backwardly and outwardly beyond the heels of said clips and formed with cup shaped enlargements, a pair of levers pivoted to said pivot ears and having their finger portions offset, nose grips carried by said levers, and springs arranged in the cavities of the cup shaped enlargements of the pivot ears and adapted to actuate the levers in one direction, substantially as set forth.

Signed at Chicago, Illinois, this 4th day of May 1909.

WILLIAM R. UHLEMANN.

Witnesses:
ROBERT BURNS,
RICHARD H. UHLEMANN.

---

Copies of this patent may be obtained for five cents each, by addressing the "Commissioner of Patents, Washington, D. C."